United States Patent
Rousseau

(10) Patent No.: US 9,625,714 B2
(45) Date of Patent: Apr. 18, 2017

(54) DEVICE FOR CLEANING A MOTOR VEHICLE DRIVING AID CAMERA

(71) Applicant: Valeo Systèmes d'Essuyage, Le Mesnil Saint Denis (FR)

(72) Inventor: Jean-François Rousseau, Charbonnier les Mines (FR)

(73) Assignee: Valeo Systèmes d'Essayage, Le Mesnil Saint Denis (FR)

(*) Notice: Subject to any disclaimer, the term of this patent is extended or adjusted under 35 U.S.C. 154(b) by 0 days.

(21) Appl. No.: 14/877,148

(22) Filed: Oct. 7, 2015

(65) Prior Publication Data
US 2016/0103316 A1    Apr. 14, 2016

(30) Foreign Application Priority Data
Oct. 10, 2014   (FR) .................................... 14 59715

(51) Int. Cl.
| | |
|---|---|
| *G02B 1/00* | (2006.01) |
| *G02B 27/00* | (2006.01) |
| *B60S 1/52* | (2006.01) |
| *B60S 1/56* | (2006.01) |
| *B60R 1/00* | (2006.01) |
| *G03B 17/56* | (2006.01) |

(52) U.S. Cl.
CPC ............ *G02B 27/0006* (2013.01); *B60R 1/00* (2013.01); *B60S 1/52* (2013.01); *B60S 1/56* (2013.01); *G03B 17/568* (2013.01)

(58) Field of Classification Search
CPC .. G02B 13/0015; G02B 27/0006; G02B 7/02; B60R 1/00; B60R 11/04; B60R 2300/101; B60R 2300/60; B60S 1/481; B60S 1/50; B60S 1/52; B60S 1/56; B60S 1/62; B60S 1/0848; G03B 17/56; G03B 17/568; G03B 17/08; H04N 5/2254; H04N 5/2252; H04N 7/183; H04N 5/2171
USPC ........................................................ 359/509
See application file for complete search history.

(56) References Cited

U.S. PATENT DOCUMENTS

| | | | |
|---|---|---|---|
| 2013/0146577 A1 | 6/2013 | Haig et al. | |
| 2014/0060582 A1 | 3/2014 | Hartranft et al. | |
| 2015/0151722 A1* | 6/2015 | Gokan | B60S 1/50 134/102.2 |

FOREIGN PATENT DOCUMENTS

| | | |
|---|---|---|
| CN | 201923085 U | 8/2011 |
| KR | 20110026220 A | 3/2011 |

OTHER PUBLICATIONS

Preliminary Search Report issued in corresponding French Application No. 1459715, dated May 29, 2015 (2 pages).

* cited by examiner

*Primary Examiner* — Euncha Cherry
(74) *Attorney, Agent, or Firm* — Osha Liang LLP

(57) ABSTRACT

A cleaning device for cleaning a lens of a motor vehicle camera is disclosed. The lens is designed to capture images along a longitudinal optical axis, and includes a cleaning head arranged in a fixed position with respect to the camera so that part of the head, that bears cleaning means, is arranged along the optical axis behind the lens. The cleaning device is applicable to the cleaning of reversing cameras positioned at the rear of the vehicle and oriented in such a way as to capture images of a road scene extending to the rear of the vehicle.

18 Claims, 3 Drawing Sheets

DEVICE FOR CLEANING A MOTOR VEHICLE DRIVING AID CAMERA

FIELD OF THE INVENTION

The invention relates to the field of driving aids and notably to the cameras installed on certain vehicles. More particularly, the invention relates to a device for cleaning such a driving-aid camera so as to optimize the quality of the information supplied to the driver.

BACKGROUND OF THE INVENTION

Certain motor vehicles are nowadays fitted with image-capturing means, particularly cameras, to assist the driver notably in parking and/or reversing manoeuvres. The clearer the image acquired by the image-capturing means, the more useful will be the information supplied to the driver.

The present invention falls within this context and has the objective of proposing a camera cleaning device that is particularly effective. To this end, one subject of the invention is a cleaning device for cleaning a lens of a motor vehicle camera designed to capture images along a longitudinal optical axis, and in which there is a bearing head bearing cleaning means, positioned at least in part around the camera and arranged in such a way that part of the head is positioned along the optical axis behind the lens, in a fixed position with respect to the camera, and advantageously out of the field of view of the camera.

What is meant here by "behind the lens" is a position in which the part of the head behind the lens on the optical axis is positioned between the lens and the road scene that the lens contributes to capturing. Moreover, what is meant by a position of the cleaning device that is "outside the field of the camera" is the fact that part of the cleaning device that is behind the lens does not impede the camera in capturing elements of the road scene in the direct vicinity of the vehicle such that the driving aid information supplied to the driver is reliable and useful, especially since it is particularly clear thanks to the regular use of the cleaning means according to the invention.

The fact that the cleaning head is fixed with respect to the camera simplifies the structure of the cleaning device which has no moving part. The bulk of the cleaning device is thus easy to take into consideration when installing the device in a motor vehicle, and the simplicity of manufacture and the lasting reliability of the device are improved in relation to existing systems.

SUMMARY OF THE INVENTION

According to features of one preferred embodiment of the invention, the lens is borne by an objective of circular cross section and the bearing head that bears the cleaning means has an annular overall shape that complements the circular shape of the objective so that it can be positioned around the lens. The bearing head that bears the cleaning means is arranged with respect to the objective of the camera in such a way that the axis longitudinally defining the head coincides with an axis of the camera, notably the optical axis defined by the lens. The head furthermore comprises an internal annular wall bearing the cleaning means and arranged in such a way that the said cleaning means are oriented towards the lens.

Provision may also be made for the bearing head that bears the cleaning means to comprise at least two differential parts, these being an annular first part that forms a base and has dimensions able to be positioned around the objective of the camera, and a second part that acts as a support for the cleaning means. The second part is arranged in such a way that the cleaning means are positioned longitudinally behind the lens and oriented towards the latter.

According to one set of features specific to one particular embodiment of the invention, considered alone or in combination, the cleaning means borne by the head consist of spray means of the spray nozzle type able to spray a cleaning liquid onto the lens. The internal annular wall of the head may then be provided with a plurality of spray nozzles that form the means of spray nozzle type and via which a cleaning liquid is able to exit bound for the lens. In that case, provision may be made for the cleaning head further to comprise an internal liquid circulation duct formed in the thickness of the head to serve each nozzle and connected to at least one water supply pipe. One particular arrangement of the device in this first embodiment is such that the internal annular wall is parallel to the axis of the annular head, the nozzles being formed by a bore opening onto the internal annular wall and extending from the internal liquid circulation duct, each bore being inclined with respect to the normal to the internal annular wall in the direction of that part of the head that is arranged around the objective so as to allow liquid to be ejected towards the lens positioned longitudinally ahead of the said nozzles.

Provision may also be made for the cleaning head to comprise two diametrically opposite water inlets and, in combination or otherwise, for the cleaning, head to comprise a discharge slot that extends radially from the internal wall towards the outside of the head, the said slot being arranged vertically at the bottom of the head in the fixed position of the head with respect to the camera.

According to one set of features specific to one particular embodiment of the invention, considered alone or in combination, the cleaning means borne by the head consist of de-icing means for de-icing the lens. In that case, provision is made for the de-icing means possibly to consist of a heating element positioned on the internal wall of the head and for this heating element possibly to consist of a ring arranged all around the periphery of the internal wall. The heating element may be bonded to the internal wall or moulded with the internal wall. Provision will be made for the head possibly to comprise an orifice able to accept a control cable so that commands for controlling these de-icing means can be transmitted.

Furthermore, the features of the two embodiments may be combined so that the cleaning means borne by the head consist of spray nozzles and of heating elements arranged separately on the internal annular wall of the head. More specifically, the spray nozzles and the heating elements, which are welded or bonded, are positioned alternately around the entire periphery of the annular wall of the head.

The invention also relates to a motor vehicle comprising a camera cleaning device as has just been described hereinabove.

In one preferred embodiment of the invention, the camera that can be cleaned by the said cleaning device is a reversing camera positioned at the rear of the vehicle and oriented to capture images of a road scene extending to the rear of the vehicle. The invention thus finds a particularly advantageous, although nonexclusive, application in the field of motor vehicle parking aids.

Other features and advantages of the present invention will become more clearly apparent with the aid of the description and drawings, among which:

DETAILED DESCRIPTION

Figure 1:
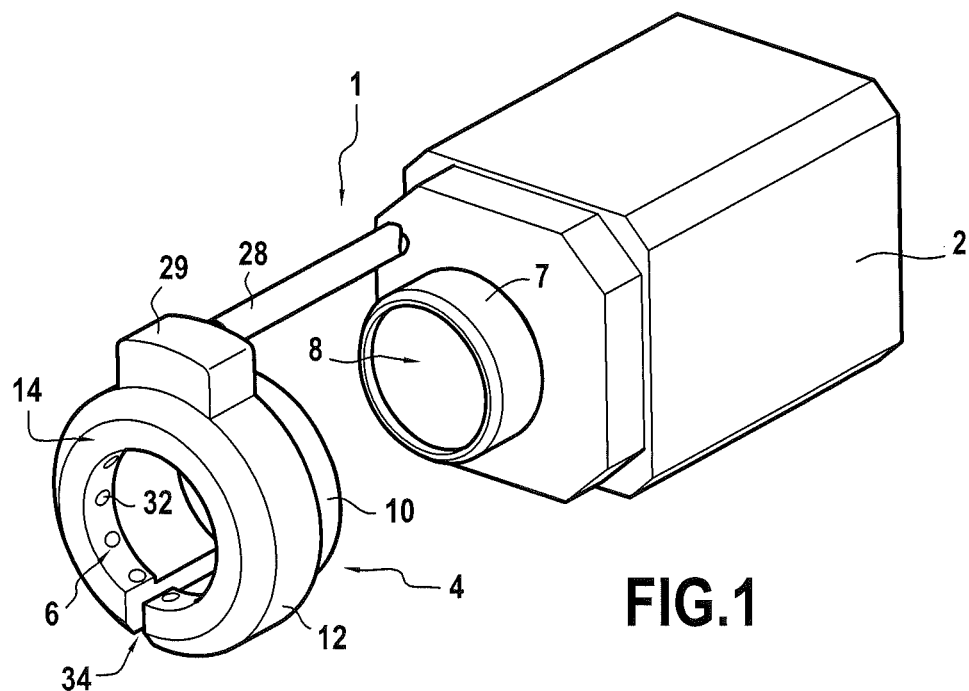
FIG. 1 is a three-quarters front perspective view of a cleaning device according to a first embodiment of the invention, depicted with the cleaning head and the camera exploded.

A cleaning device 1 according to the invention notably comprises a camera 2 and a bearing head 4 bearing cleaning means 6, these two elements that are the camera and the head being fixed one with respect to the other. The camera 2 forms means of capturing an image of a road scene situated anywhere around the vehicle and advantageously to the rear of the vehicle in order to provide the driver with information when he is reversing.

The reversing camera 2 is fixed into a structural element of the vehicle, for example near the rear bumper. At one longitudinal end, in this instance facing towards the rear of the vehicle, it comprises an objective 7 taking the form of a cylinder of circular cross section and which at its free end has a lens 8 that needs to be cleaned at prescribed regular intervals or before each use of the reversing camera. It is advantageous to plan for the camera and the cleaning head to be installed in the structure of the motor vehicle in such a way that the end of the camera allowing the image capturing is positioned as close as possible to the exterior bodywork of the vehicle so as to acquire the widest possible images of the road scene.

The head 4 bearing the cleaning means comprises at least one annular first part 10 forming a base and the internal diameter of which is substantially greater than the external diameter of the objective 7, and a second part 12, likewise annular, forming a support for the cleaning means and here having a diameter slightly smaller than that of the base 10. When the head is mounted fixedly around the lens, the first part is positioned around the objective and the second part is positioned longitudinally behind the lens. The cleaning means are oriented towards the lens.

The second part 12 of the head, which acts as a support for the cleaning means, is longitudinally delimited at one end via a distal end face 14 oriented towards the outside of the vehicle. The distal end face 14 is depicted here as being planar but it will be appreciated that it could have a different shape, notably so as to fit the space in the structure of the vehicle around the camera and lie flush with the exterior bodywork of the vehicle.

The second part 12 is furthermore delimited transversely by an internal annular wall 16 in the direct vicinity of the lens. In the various embodiments illustrated, it may be seen that it is the internal annular wall 16 that bears the lens-cleaning means, while the means of commanding these cleaning means are connected on the outside of the cleaning head.

As described previously, the head 4 bearing the cleaning means is rendered fixed with respect to the camera. Collaborative means of fixing between the camera and the cleaning head could be provided, for example using a binding screw 18 visible in FIG. 4. Provision could also be made for the head 4 to be fixed to a structural element of the vehicle, advantageously the same as the one to which the camera 2 is fixed. It will be appreciated that when the head and the camera are in the assembled position it is important firstly for the cleaning means to be oriented towards the lens so as to have an effect thereon when switched on, and secondly for these cleaning means and the internal annular wall 16 that bears them not to lie in the field of the camera.

Figure 3:
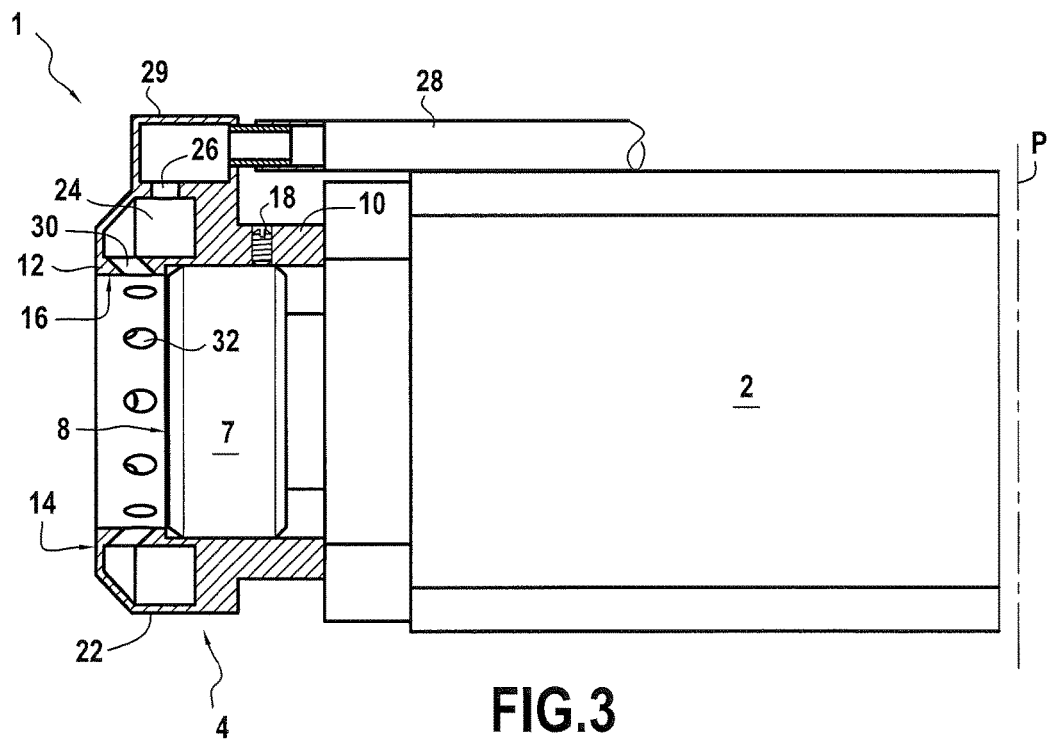
FIG. 3 is a view in longitudinal section of the device of FIG. 2.

A position of the head with respect to the camera can be defined that conforms to the position desired by the invention with reference to FIG. 3 notably. In a projection in a vertical and transverse plane perpendicular to the optical axis and referenced "P" in FIG. 3, the internal annular wall surrounds the lens, whereas longitudinally, the internal annular wall is substantially flush with the lens, behind the latter, which means to say between the lens and the road scene filmed by the camera.

According to various embodiments, two of which have been depicted by way of example hereinafter, the type of cleaning means and the inclination of the internal annular wall that bears them can be varied to ensure that the cleaning means have a good effect on the lens.

In a first embodiment, illustrated notably in FIGS. 1 to 4, the cleaning means borne by the internal annular wall 16 of the head consist of spraying means 20, of the spray nozzle type, able to spray onto the lens a fluid which may notably be cleaning liquid or pressurized air.

The head 4 therefore comprises a collar 22 extending longitudinally straddling the first and second part and in which there is bored an internal fluid circulation duct 24 which extends in an annulus in the thickness of the head, about the axis thereof. The duct is arranged in such a way that emerging from it are, on the one hand, at least one external radial bore 26 to which a water supply pipe 28 is connected, via a projecting boss 29 of the collar that allows the pipe to be connected without this pipe resting against the cleaning head, and on the other hand a plurality of internal radial bores 30 which at the opposite end open onto the internal annular wall thus forming on this internal annular wall 16 of the head a plurality of nozzles 32 that form the spraying means of spray nozzle type. The cleaning liquid, or the air, is able to leave via these nozzles bound for the lens.

The spray nozzles 32 are advantageously arranged over the entire periphery of the head. An even distribution of these nozzles is planned, the number of nozzles and spacing between nozzles being left for the manufacturer to determine. The nozzles are arranged in a circle around the axis of the cleaning head on the internal annular wall 16 and the nozzles 32 and the internal annular wall are arranged in such a way that the nozzles are oriented so that they eject the liquid with a transverse component towards the inside of the head, namely towards the axis of the annular cleaning head, and with a longitudinal component towards the first part of the cleaning head that forms the base. According to the embodiment illustrated, the internal annular wall is parallel to the axis of the annular head and the internal radial bores that form the nozzles are inclined with respect to the normal to the internal annular wall towards the base of the head arranged around the objective so as to allow liquid to be ejected towards the inside of the head and towards the first part forming the base of the head so that the ejected liquid comes into contact with the lens positioned longitudinally ahead of the said nozzles.

Figure 4:
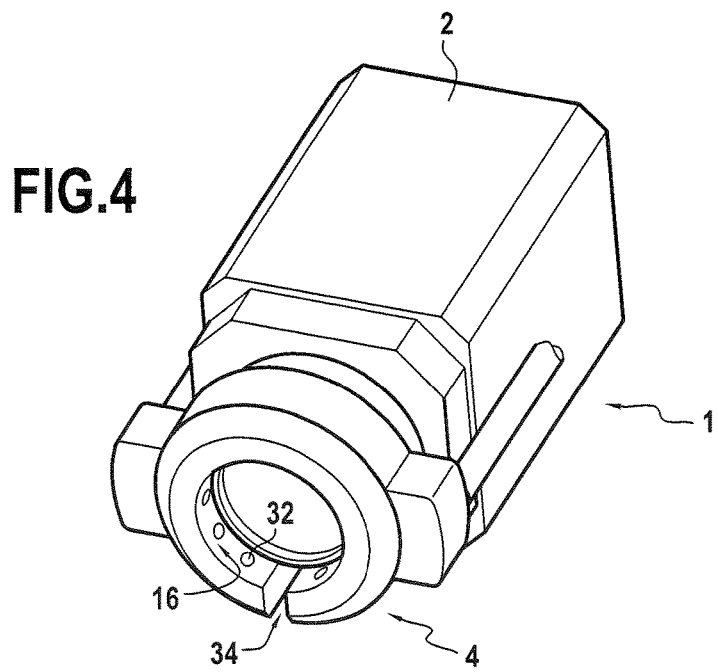
FIG. 4 is a perspective view from above of a cleaning device according to a variant of the first embodiment.

As a variant, illustrated in FIG. 4, provision may be made for the cleaning head to comprise two cleaning liquid supply pipes connected to the internal duct respectively by an external radial bore, the supply pipes here being diametrically opposite. It will be appreciated that without departing from the context of the invention, the number of cleaning liquid supply pipes and the arrangement thereof may differ and that it is just as possible to have a single supply pipe as it is to have a plurality thereof. The cleaning liquid supply pipes are connected at their opposite end to a source of liquid pressurized by a device of the pump type so as to allow liquid to arrive at enough pressure that it can be sprayed by the spray nozzles. It will be appreciated that, in a variant, the pipes and circulation duct inside the cleaning head may, instead of allowing a cleaning liquid to circulate, allow pressurized air to circulate so that the spray nozzles are able to eject air the blast of which drives away any dirt present on the lens.

Figure 2:
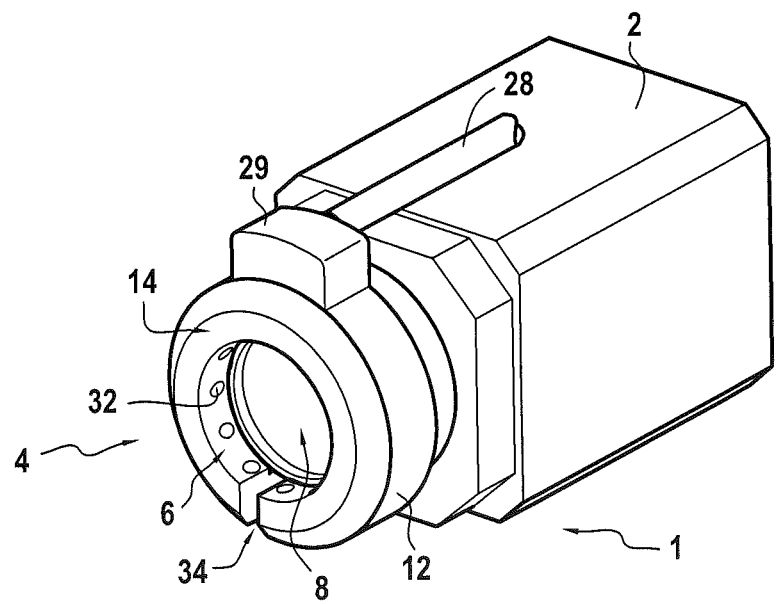
FIG. 2 is a three-quarters front perspective view of the cleaning device of FIG. 1, this time assembled.

The cleaning head further comprises a discharge slot 34 extending radially from the internal wall towards the outside of the head. This slot is particularly useful for removing under gravity the dirt removed from the lens and the cleaning liquid when such a liquid is sprayed by the cleaning means. For that purpose the cleaning head needs to be positioned with respect to the structure of the vehicle such that the slot is positioned vertically beneath the head, as can be seen in FIGS. 1, 2 and 4.

Figure 5:
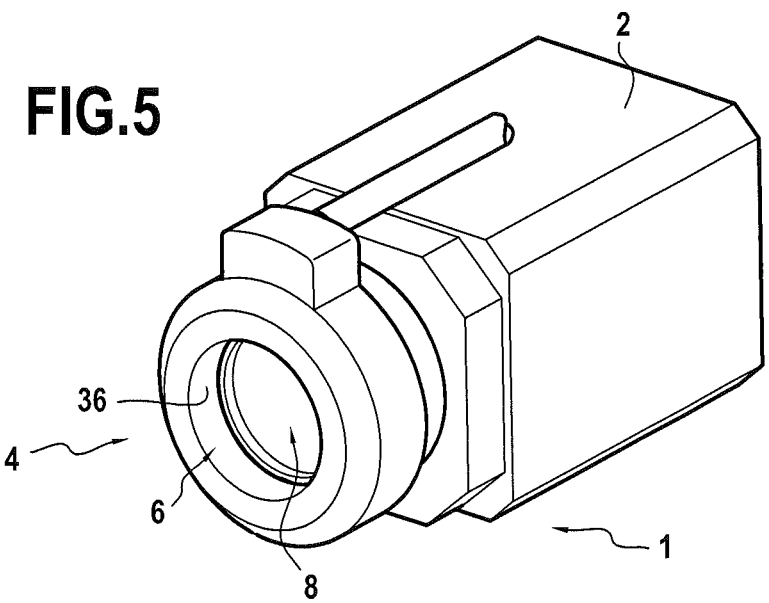
FIG. 5 is a three-quarters front perspective view of a cleaning device according to a second embodiment of the invention, depicted assembled, the second embodiment notably differing from the first embodiment in that the cleaning means borne by the head are in this instance heating means rather than spraying means.
Figure 6:
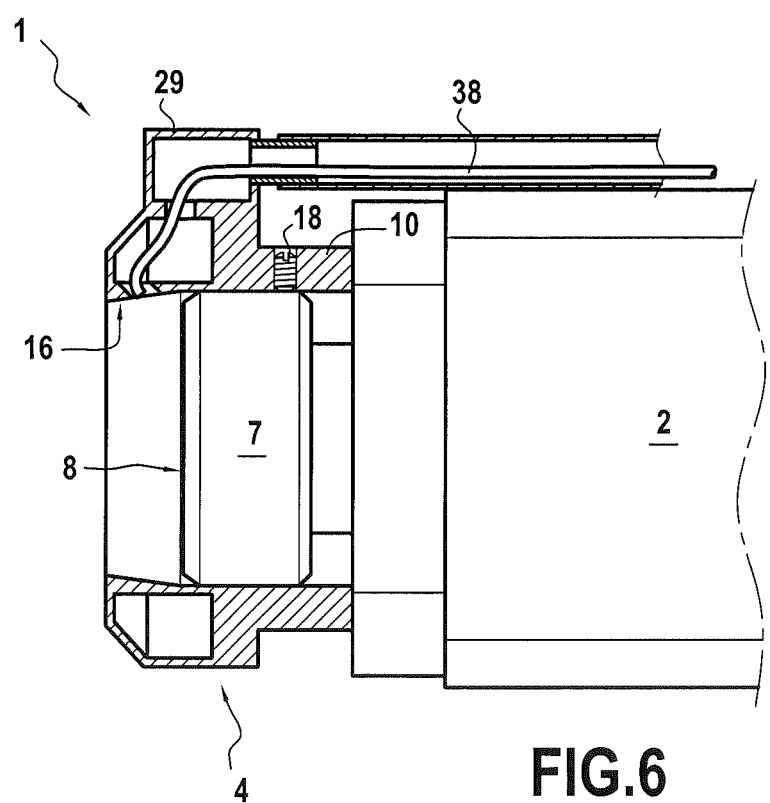
FIG. 6 is a view in longitudinal section of the device of FIG. 5.

In a second embodiment, illustrated in FIGS. 5 and 6, the cleaning means borne by the head consist of lens de-icing means 36, and more particularly of a heating element arranged on the internal annular wall 16 of the cleaning head.

The heating element needs to be flexible so as to follow the curvature of the internal annular wall and may be constructed in the conventional way using a high-resistivity electric wire embedded in a flexible sheet, the increase in wire temperature being controlled by a command generated by the control module associated with the cleaning device.

Provision may be made for this heating element to take the form of a ring positioned all around the periphery of the internal wall, but it will be appreciated that, as an alternative, and notably when the two embodiments as described separately in the description are being combined, the heating element could be positioned discontinuously around the periphery of the internal wall, piece by piece. In both instances, the heating element that forms the de-icing means 36 may be bonded to the internal annular wall 16 in a process step subsequent to the manufacture of the cleaning head or may alternatively be incorporated into the internal annular wall while the cleaning head is being moulded.

In this second embodiment, an internal duct is also formed in the thickness of the cleaning head so as to allow control cables 38 for the said de-icing means to be passed through from outside the device towards the internal annular wall and the heating element, the opposite ends of the cables being connected to actuators, not depicted here and controlled by the control module.

The way in which the cleaning device according to the invention works will now be described with reliance notably on FIGS. 1 to 4 that illustrate the first embodiment. It will be appreciated that whether it is a device corresponding to the first or to the second embodiment, provided the camera and the cleaning head remain fixed, the overall principle of operation of the device will not differ.

The cleaning head 4 is fixed with respect to the camera and to the lens 8 so that it does not lie in the field of view of the camera. The head thus does not impair the quality of image capture and driving assistance provided to the driver.

When a situation in which the reversing camera may potentially be used is detected, for example when the clutch is engaged or alternatively when the preset cleaning interval has elapsed, a control module generates a cleaning instruction, and in this instance supplies cleaning liquid to the internal circuit of the cleaning head via one or more supply pipes.

The pressurized cleaning liquid in the supply pipe spreads through the internal circuit to emerge at each of the cleaning nozzles. The orientation of the bore defining each of the nozzles ejects the liquid ahead of the cleaning head with respect to the optical axis and such that it is centred on this optical axis so as to shower the lens copiously. The cleaning liquid is then discharged under gravity at the slot made radially in the thickness of the cleaning head, and this discharging of liquid is accompanied by the discharging of the dirt originally present on the lens.

It will be appreciated that features of the cleaning device according to the second embodiment could be combined with features of the cleaning device according to the first embodiment. Provision could thus be made for the de-icing means, notably partial heating elements, to be bonded between two spray nozzles and for the control module associated with the cleaning device to be capable of generating such or such a command, namely an instruction to inject cleaning liquid into the water supply pipes or an electrical command instructing an increase in temperature of the partial heating elements, depending on detected information such as the exterior temperature for example. The commands may be generated simultaneously, so that de-icing and spraying towards the lens take place simultaneously, notably if the fluid sprayed is air rather than liquid as described hereinabove, or they could be generated with a temporal offset.

It will be appreciated that such a combination may be advantageous insofar as the heating element attached to the internal wall between the spray nozzles can act as a means of de-icing the lens as described hereinabove but also as a means of warming the spray nozzles themselves to prevent ice from forming at the outlet of these nozzles.

The foregoing description clearly explains how the invention makes it possible to achieve its stated objectives and notably how it proposes a cleaning device in which a head is able correctly to clean a camera, notably a reversing camera, lens without, on the one hand, requiring additional drive means for driving a movement of the said cleaning head towards an active lens-cleaning position and without on the other hand the cleaning head lying in the field of view of the camera or impairing image capture.

Of course, various modifications may be made by those skilled in the art to the structures of the cleaning device provided that they allow the camera lens to be cleaned with a cleaning head that remains always behind the lens with respect to the optical axis without however lying in the field of view of the camera by virtue of dimensions that allow it to surround the lens. Such a combination of features means that the lens can be cleaned with a mechanism that is non-mobile and therefore reliable, but the permanent position of which is not detrimental to image capture and to the driving assistance provided to the driver. The embodiments that have been described in detail hereinabove place no restrictions on the invention. In any event, the invention is not restricted to the embodiments specifically described in this document and in particular extends to any equivalent means and any technically feasible combination of these means.

The invention claimed is:

1. A cleaning device for cleaning a lens of a motor vehicle camera which lens is designed to capture images along a longitudinal optical axis, comprising:

a cleaning head arranged in a fixed position with respect to the camera and having an annular overall shape, of axis coincident with the axis of the lens, said cleaning head comprising an internal annular wall being arranged along the optical axis behind the lens and bearing cleaning means oriented towards the lens, wherein the internal annular wall of the head is equipped with a plurality of nozzles via which a fluid is able to exit bound for the lens.

2. The cleaning device according to claim 1, wherein the cleaning head comprises at least an annular first part forming a base and having dimensions able to be positioned around the camera, and a second part forming a support for the cleaning means, the said second part being arranged in such a way that the said cleaning means are positioned along the optical axis behind the lens and oriented towards the latter.

3. The cleaning device according to claim 2, wherein the second part has a diameter slightly smaller than that of the first part.

4. The cleaning device according to claim 1, wherein the said internal annular wall is parallel to the axis of the head, the nozzles being formed by a bore opening onto the internal annular wall and being inclined with respect to the normal to the internal annular wall in the direction of that part of the head that is arranged around the objective so as to allow liquid to be ejected towards the lens positioned longitudinally ahead of the said nozzles.

5. The cleaning device according to claim 1, wherein the said cleaning head further comprises an internal liquid circulation duct formed within the thickness of the head to serve each nozzle and connected to at least one water supply pipe.

6. The cleaning device according to claim 5, wherein the nozzles extend from the internal liquid circulation duct.

7. The cleaning device according to claim 1, wherein the cleaning head comprises two diametrically opposite water inlets.

8. The cleaning device according to claim 1, wherein the cleaning head comprises a discharge slot extending radially from the internal annular wall towards the outside of the head, the said slot being positioned vertically at the bottom of the head in the fixed position of the head with respect to the camera.

9. The cleaning device according to claim 1, wherein the cleaning means borne by the head comprise de-icing means for de-icing the lens.

10. The cleaning device according to claim 9, wherein the de-icing means consist of a heating element positioned on the internal wall of the head.

11. The cleaning device according to claim 10, wherein the said heating element consists of a ring arranged all around the internal wall.

12. The cleaning device according to claim 10, wherein the heating element is bonded to the internal wall.

13. The cleaning device according to claim 10, wherein the heating element is moulded with the internal wall.

14. The cleaning device according to claim 9, wherein the head comprises an orifice able to receive a control cable for operating the said de-icing means.

15. The cleaning device according to claim 1, wherein the cleaning means borne by the head consist of spray nozzles and of heating elements arranged separately on the internal annular wall of the head.

16. The cleaning device according to claim 15, wherein the spray nozzles and the heating elements, which are welded or bonded, are arranged alternately around the entire periphery of the internal annular wall of the head.

17. A motor vehicle comprising a cleaning device for cleaning a camera according to claim 1.

18. The motor vehicle according to claim 17, wherein the camera cleaned by the said cleaning device is a reversing camera positioned at the rear of the vehicle and oriented to capture images of a road scene extending to the rear of the vehicle.

* * * * *